(12) United States Patent
Kim et al.

(10) Patent No.: US 10,230,496 B2
(45) Date of Patent: Mar. 12, 2019

(54) METHOD AND APPARATUS FOR PROCESSING CONTROL MESSAGE WHICH REQUESTS RETRANSMITTING DATA

(75) Inventors: Soeng Hun Kim, Suwon-si (KR); Jung Woong Lee, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1092 days.

(21) Appl. No.: 12/611,592

(22) Filed: Nov. 3, 2009

(65) Prior Publication Data

US 2010/0110971 A1 May 6, 2010

(30) Foreign Application Priority Data

Nov. 4, 2008 (KR) .................. 10-2008-0108719

(51) Int. Cl.
*H04L 1/16* (2006.01)
*H04W 28/06* (2009.01)

(52) U.S. Cl.
CPC .......... *H04L 1/1614* (2013.01); *H04L 1/1635* (2013.01); *H04L 1/1642* (2013.01); *H04W 28/065* (2013.01)

(58) Field of Classification Search
CPC .......................................... H04L 1/16–1/1685
USPC ...... 370/235, 235.1, 236, 236.1, 236.2, 237, 370/238, 238.1, 310.2, 328–339, 349, 370/394; 455/422.1; 714/18, 748–751
See application file for complete search history.

(56) References Cited

U.S. PATENT DOCUMENTS

| | | | |
|---|---|---|---|
| 5,151,899 A * | 9/1992 | Thomas et al. | 370/394 |
| 5,440,545 A * | 8/1995 | Buchholz et al. | 370/426 |
| 6,367,045 B1 * | 4/2002 | Khan et al. | 714/748 |
| 6,505,253 B1 * | 1/2003 | Chiu et al. | 709/235 |
| 2001/0040895 A1 * | 11/2001 | Templin | 370/466 |
| 2002/0080792 A1 * | 6/2002 | Rosier | 370/394 |

(Continued)

FOREIGN PATENT DOCUMENTS

| CN | 1113402 A | 12/1995 |
|---|---|---|
| JP | 2007503779 A | 2/2007 |

(Continued)

OTHER PUBLICATIONS

3GPP TS 36.323 v8.1.0 (Mar. 2008), 3rd Generation Partnership Project; Technical Specification Group Radio Access Network; Evolved Universal Terrestrial Radio Access (E-UTRA); Packet Data Convergence Protocol (PDCP) specification (Release 8), Mar. 2008.*

(Continued)

*Primary Examiner* — Hoon J Chung

(74) *Attorney, Agent, or Firm* — Jefferson IP Law, LLP

(57) ABSTRACT

A method and an apparatus for processing a control message for a request of retransmission are provided. The method includes generating a First Missing Serial number (FMS) describing a serial number of a data unit having a lowest serial number among data units which are not received, determining whether a data unit having a serial number greater than the serial number described in the FMS exists due to an out of sequence among data units which are previously received, generating a bitmap indicating a reception of a plurality of data units having a serial number greater than the FMS, if a data unit which is out of sequence exists, and connecting and transmitting the FMS and the bitmap.

14 Claims, 8 Drawing Sheets

(56) References Cited

U.S. PATENT DOCUMENTS

| | | | |
|---|---|---|---|
| 2003/0081576 A1 | 5/2003 | Kim et al. | |
| 2003/0088822 A1 | 5/2003 | Kim et al. | |
| 2005/0111389 A1 | 5/2005 | Dick et al. | |
| 2009/0238142 A1* | 9/2009 | Chun | H04W 28/06 370/331 |
| 2011/0228746 A1* | 9/2011 | Chun et al. | 370/331 |

FOREIGN PATENT DOCUMENTS

| | | |
|---|---|---|
| KR | 10-2002-0014941 A | 2/2002 |
| WO | 00/62466 A2 | 10/2000 |
| WO | 2006/118418 A2 | 11/2006 |
| WO | 2008048072 A1 | 4/2008 |

OTHER PUBLICATIONS

LG, Correction to PDCP Status Report, 3GPP TSG-RAN2 Meeting #61bis-R2-081594, ShenZhen, China, Mar. 31, 2008-Apr. 4, 2008, 8 pages.*

3GPP TS 36.323 v8.3.0 (Sep. 2008), Technical Specification Group Radio Access Network, Evolved Universal Terrestrial Radio Access (E-UTRA), Packet Data Convergence Protocol (PDCP) specification (Release 8), Sep. 2008, 25 pages.*

Huawei, CR on Bitmap setting of PDCP status report, 3GPP TSG-RAN WG2 Meeting #64 [R2-086364], Nov. 3, 2008 (see p. 9 or 6/21 for publication timestamp [Nov. 3, 2008—12:56 PM]), 24 pages.*

Electronics, Correction to PDCP Status Report, R2-081594, 3GPP, Mar. 25, 2008.

Huawei, CR on Bitmap setting of PDCP status report, R2-086364, 3GPP, Nov. 3, 2008.

RLC Protocol Specification (3G TS 25. 322 version 1. 3. 0), R2-99643, 3GPP, Sep. 17, 1999.

Huawei, "Bitmap setting of PDCP status report", 3GPP 3rd Generation Partnership Project TSG RAN WG2 meeting #64, R2-086363, 61.33, Nov. 2008.

3rd Generation Partnership project 3GPP TS 36.323 V8.3.0, Sep. 18, 2008.

* cited by examiner

METHOD AND APPARATUS FOR PROCESSING CONTROL MESSAGE WHICH REQUESTS RETRANSMITTING DATA

PRIORITY

This application claims the benefit under 35 U.S.C. § 119(a) of a Korean patent application filed in the Korean Intellectual Property Office on Nov. 4, 2008 and assigned Serial No. 10-2008-0108719, the entire disclosure of which is hereby incorporated by reference.

BACKGROUND OF THE INVENTION

1. Field of the Invention

The present invention relates to a method and apparatus for processing a control message. More particularly, the present invention relates to a method and apparatus for processing a control message that requests retransmission of data to prevent packet losses and unnecessary retransmissions.

2. Description of the Related Art

A Universal Mobile Telecommunication Service (UMTS) system is a third generation asynchronous mobile communication system based on Global System for Mobile Communications (GSM) and General Packet Radio Services (GPRS), which are European mobile communication systems, and uses Wideband Code Division Multiple Access (W-CDMA).

A Long Term Evolution (LTE) is being evolved as a next generation mobile communication system in a 3rd Generation Partnership Project (3GPP) which is currently in charge of UMTS standardization. The LTE is a technology that implements communication based on high-speed packets having a maximum of about 100 Mbps, and has a goal to be commercialized in the year 2010. For this, various methods are being evolved. For example, the various methods include a method for reducing a number of nodes positioned on a channel by simplifying a network structure and a method for providing wireless protocols close to a wireless channel.

FIG. 1 illustrates a conventional configuration of a next generation mobile communication system. Here, the configuration of the mobile communication system is based on a UMTS system.

Referring to FIG. 1, the mobile communication system includes Evolved Radio Access Networks (E-RANs) 110, 112 that are simplified as a two-node structure of evolved Node Bs (eNBs) or base stations 120, 122, 124, 126 and 128, and Evolved Packet Cores (EPCs) 130, 132, which is also none as upper nodes, such as Access Gateways. A User Equipment (UE) or user terminal 101 connects to an Internet Protocol (IP) network 114 by the E-RANs 110, 112.

The eNBs 120 to 128 correspond to an existing node B of the UMTS system and is connected to the UE 101 with a wireless channel. However, unlike the existing node B, eNB 120 to 128 plays complicated roles. In a Long Term Evolution (LTE), entire user traffic including real-time services, such as Voice over IP (VoIP) through the IP, is serviced through a shared channel, so that an apparatus which collects information of the UE 101 and performs scheduling is required. The scheduling is performed by the eNBs 120 to 128. In order to implement the maximum 100 Mbps, the LTE uses Orthogonal Frequency Division Multiplexing (OFDM) as a wireless connection technology with a maximum of 20 MHz bandwidth. Also, an Adaptive Modulation & Coding (AMC) method, which determines a modulation scheme and a channel coding rate according to the channel state of the terminal, is applied.

FIG. 2 is a drawing illustrating a conventional wireless protocol layer of a LTE system.

Referring to FIG. 2, the wireless protocol of the LTE system includes Packet Data Convergence Protocols (PDCPs) 205 and 240, Radio Link Controls (RLCs) 210 and 235, and Medium Access Controls (MACs) 215 and 230. The PDCPs 205 and 240 performs IP header compression/restoration, ciphering/deciphering, lossless handover support, and the like. After a handover between eNBs is completed, a lossless handover is accomplished as a PDCP status report having reception information that includes whether a PDCP Service Data Unit (SDU), which was not received by a PDCP layer, has been received is transmitted and another PDCP layer retransmits the data unit (i.e., the PDCP SDU) that was not received.

The PDCP status report may express reception information indicating the reception of a corresponding data unit through a Sequence Number (SN) of the data unit. The RLCs 210 and 235 perform an Automatic Retransmitting Request (ARQ) operation by reconfiguring a PDCP Packet Data Unit (PDU) (hereinafter, a packet output from a certain protocol layer apparatus is called a PDU of the protocol) with an appropriate size. The MACs 215 and 230 are connected to several RLC devices configured in one terminal. The MACs 215 and 230 also multiplex RLC PDUs into an MAC PDU and demultiplexes RLC PDUs from the MAC PDU.

Physical layers (PHYs) 220 and 225 perform channel coding and modulation for upper layer data, provide the data as OFDM symbols and transmit the OFDM symbols to a wireless channel. Alternatively, the PHYs 220 and 225 perform demodulation and channel decoding for OFDM symbols received through the wireless channel and transmits the OFDM symbols to the upper layer. Here, the PDCP status report does not express reception information indicating whether a corresponding data unit has been received.

Therefore, a need exists for a method and apparatus for efficiently receiving and transmitting reception information that indicates whether a data unit has been received.

SUMMARY OF THE INVENTION

An aspect of the present invention is to address at least the above-mentioned problems and/or disadvantages and to provide at least the advantages described below. Accordingly, an aspect of the present invention is to provide a method and apparatus for efficiently receiving and transmitting a control message having reception information indicating whether a corresponding data unit has been received.

In accordance with an aspect of the present invention, a method for transmitting a control message for a request of retransmission is provided. The method includes generating a First Missing Sequence number (FMS) describing a sequence number of a data unit having a lowest sequence number among data units which are not received, determining whether a data unit having a sequence number greater than the sequence number described in the FMS exists due to an out of sequence among data units which are previously received, generating a bitmap indicating a reception of a plurality of data units having a sequence number greater than the FMS, if a data unit which is out of sequence exists, and connecting and transmitting the FMS and the bitmap.

In the generating of the bitmap, the data units which are not received and the data units not existing in a buffer may be set with a bit "0".

In accordance with another aspect of the present invention, a method for receiving a control message for a request of retransmission is provided. The method includes receiving a reception status report including an FMS and a bitmap, and continuously storing data units which the FMS indicates and data units including a bit "0" in the bitmap among the data units stored in a transmission buffer to retransmit.

After receiving a reception status report, the data units having a sequence number lower than the sequence number described in the FMS may be removed, and the data units including a bit "1" in the bitmap may be removed.

In accordance with still another aspect of the present invention, an apparatus for transmitting a control message for a request of retransmission is provided. The apparatus includes a PDCP reception processor comprising a buffer for temporarily storing received data units, and a PDCP controller for generating an FMS describing a sequence number of a data unit having a lowest sequence number among data units which are not received, for determining whether a data unit having a sequence number greater than the sequence number described in the FMS exists due to an out of sequence among data unit which are previously received, for generating a bitmap indicating a reception of a plurality of data units having a sequence number greater than the FMS if a data unit which is out of sequence exists, and for connecting and transmitting the FMS and the bitmap.

In the generating of the bitmap, the PDCP controller may set the data units which are not received and the data units not existing in the buffer with a bit "0".

In accordance with yet another aspect of the present invention, an apparatus for receiving a control message for a request of retransmission is provided. The apparatus includes a PDCP transmission processor including a buffer for storing data units which are previously transmitted before retransmission, and a PDCP controller for continuously storing data units which an FMS indicates and data units including a bit "0" in a bitmap among the data units stored in the buffer to retransmit if a reception status report including the FMS and the bitmap is received.

The PDCP controller may remove the data units having a sequence number lower than the sequence number described in the FMS and the data units including a bit "1" in the bitmap.

Accordingly, unnecessary packet transmission and reception, and packet loss may be prevented by efficiently transmitting reception information indicating whether a corresponding data unit of a PDCP status report has been received.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method for efficiently performing a retransmission of data according to a Packet Data Convergence Protocol (PDCP) in a lossless handover and a method for transceiving a PDCP status report.

Figure 1:
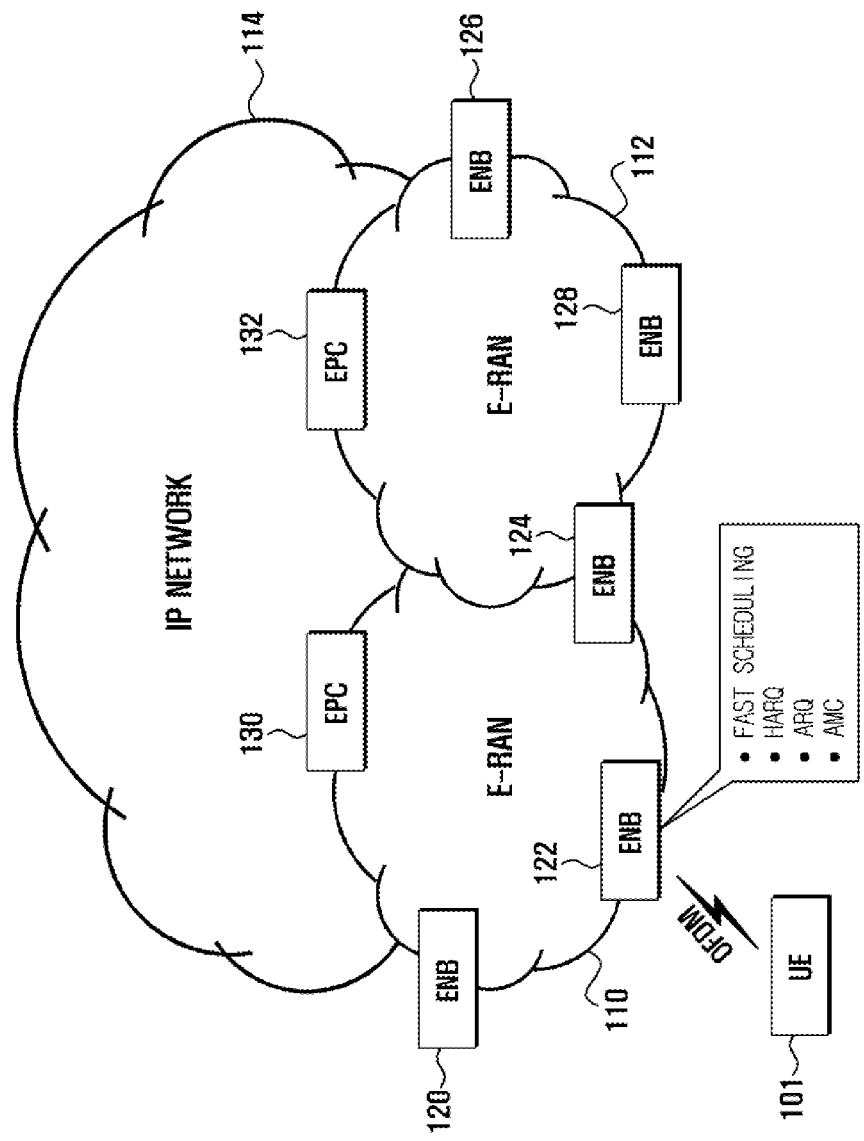
FIG. 1 illustrates a conventional configuration of a next generation mobile communications system based on an Universal Mobile Telecommunication Service (UMTS) system.
Figure 2:
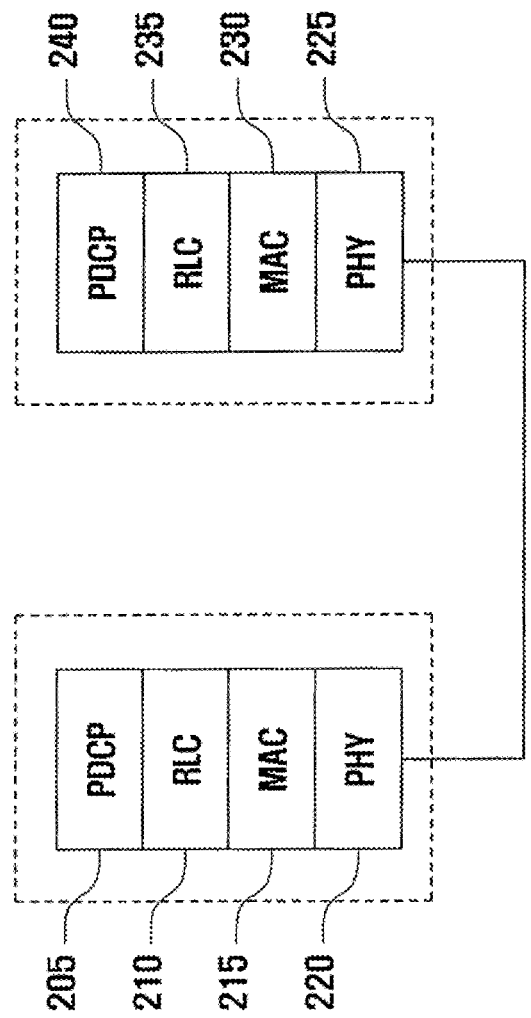
FIG. 2 is a drawing illustrating a conventional wireless protocol layer of a Long Term Evolution (LTE) system.
Figure 3:
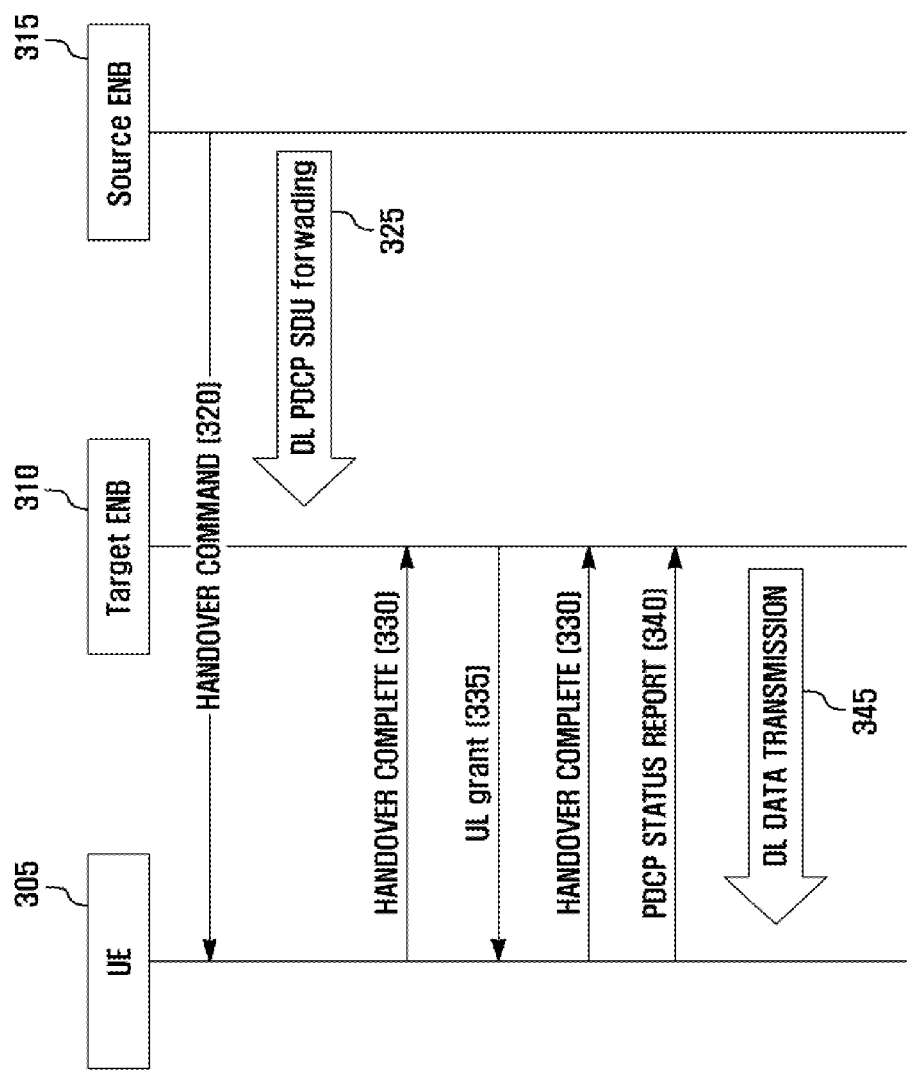
FIG. 3 is a drawing illustrating a Packet Data Convergence Protocol (PDCP) status report transceiving method based on a lossless handover according to an exemplary embodiment of the present invention.

FIG. 3 is a drawing illustrating a PDCP status report transceiving method based on a lossless handover according to an exemplary embodiment of the present invention.

Referring to FIG. 3, it is assumed herein that a terminal 305 moves from a source base station 315, which is a serving base station providing a broadband wireless communications service, to a target base station 310. For the terminal 305 movement, if the terminal 305 reports to the source base station 315 a measurement result regarding a target base station 310, the source base station 315 determines a handover, thereafter, proceeding a handover preparation procedure between the source base station 315 and the target base station 310. If the preparation procedure is completed, the source base station 315 transmits a handover command message commanding a handover to the terminal 305 in step 320.

Even in a handover, the source base station 315 transmits data to the terminal 305, and the data which is not transmitted may be forwarded to the target base station 310. As a result, data may be lost. Therefore, the source base station 315 and the target base station 310 may prevent the loss of data, which may be generated during the handover process, through an exchange of a PDCP status report message. For example, in a Down Link (DL) transmission, after the source base station 315 transmits the handover command message to the terminal 305 in step 320, the source base station 315 transmits PDCP Service Data Units (SDUs) in which a successful transmission is not verified from the terminal 305 to the target base station 310 in step 325. The terminal 305, which performed the handover to the target base station 310, transmits a handover complete message to the target base station 310 and gives notice to the target base station 310 that the handover was successful in step 330. The target base station 310 may then assign a transmission resource to the terminal 305 in step 335. If the target base station 310 assigns an Up Link (UL) transmission resource to the terminal 305 in step 335, the terminal 305 transmits the PDCP status report message receiving DL PDCP SDU reception conditions to the target base station 310 in step 340.

The target base station 310 performs the DL data transmission with reference to the PDCP status report from the PDCP SDUs that the terminal 305 did not receive in step 345. That is, the target base station 310 may transmit data, which the PDCP status report commands among the PDCP SDUs in which a successful transmission received is not verified, to the terminal 305 in step 345. The PDCP status report is described in more detail below.

Figure 4:
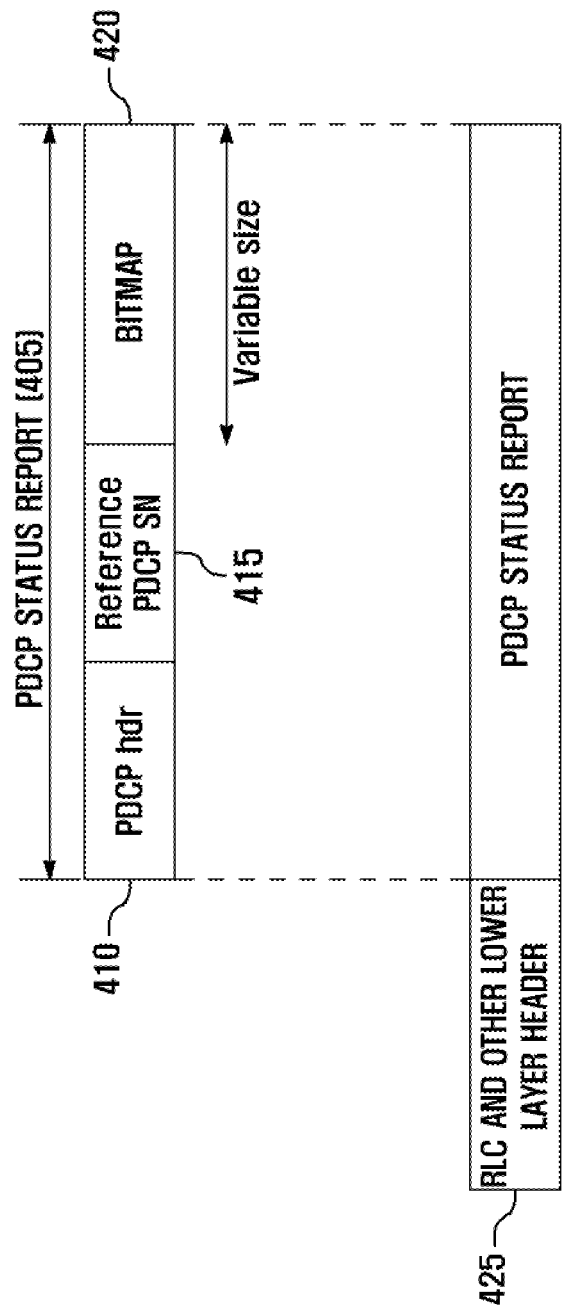
FIG. 4 is a drawing illustrating a PDCP status report according to an exemplary embodiment of the present invention.

FIG. 4 is a drawing illustrating a PDCP status report according to an exemplary embodiment of the present invention.

Referring to FIG. 4, the PDCP status report 405 includes a PDCP header 410, a reference PDCP Sequence Number (SN) 415 and a bitmap 420. The reference PDCP SN 415 is a reference value regarding the PDCP SN corresponding to bits of the bitmap 420 and may be called a First Missing SN (FMS). Hereinafter, both of the PDCP SN and the FMS will be used interchangeably with the same meaning.

A bit "0" of the bitmap 420 indicates that a corresponding PDCP SDU is not received, and the bit "1" indicates that a corresponding PDCP SDU is received. The size of the bitmap 420 is variable according to a difference between the SN of the PDCP SDUs which requires retransmission, and an arranged byte. The PDCP status report 405 may be generated immediately after the handover is directed to a terminal or after completion of the handover. A lower layer header 425, such as a Radio Link Control (RLC) header, is adhered to the PDCP status report 405 before being transmitted through a radio channel. The PDCP SN 415 and the bitmap 420 are described in more detail below.

Figure 5:
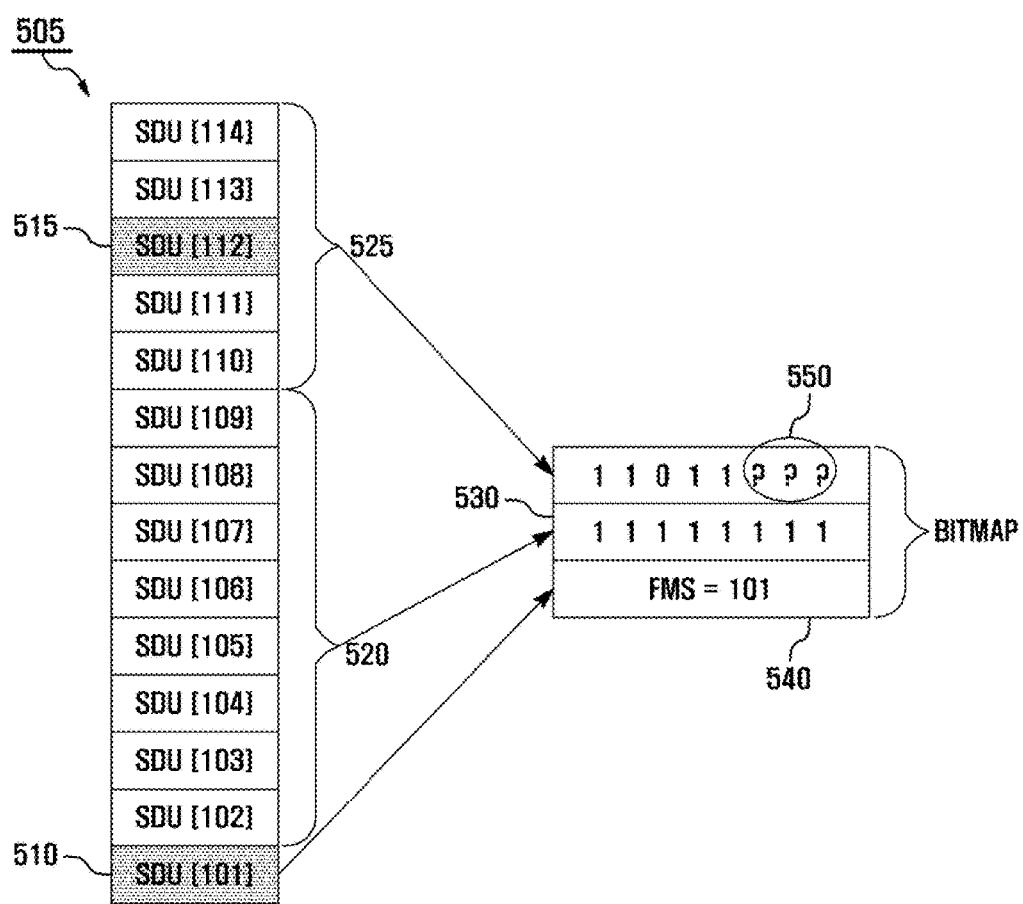
FIG. 5 is a drawing illustrating a PDCP Sequence Number (SN) and a bitmap of a PDCP status report according to an exemplary embodiment of the present invention.

FIG. 5 is a drawing illustrating a PDCP SN and a bitmap of a PDCP status report according to an exemplary embodiment of the present invention.

Referring to FIG. 5, after a terminal performs a handover, it is assumed herein that a reception status of a PDCP SDU is the same as a reception buffer (i.e., PDCP buffer) 505. An SDU [x] is a PDCP SDU having a serial number x, which is illustrated in SDU [101] to SDU [114]. In SDU [101] 510 and SDU [112] 515, a PDCP SDU is not received. The remaining PDCP SDUs indicate that the PDCP SDUs are received. Since the serial number of the SDU which is lower than the SDUs which are not received is accepted in an FMS field 540, the serial number "101" is accepted in the FMS field. The information regarding the PDCP SDUs corresponding to the FMS serial number (e.g., FMS="101") which is accepted in the FMS field is accepted in the bitmap 420 adhered to a next FMS field 540. That is, in a first byte 530 of the bitmap, information regarding SDU [102] to SDU [109] 520 is accepted. The information regarding SDU [110] to SDU [114] 525 is accepted in a second byte 550 of the bitmap. At this time, the received SDU is indicated with a bit "1" while the SDU which is not received is indicated with a bit "0". Since a relevant PDCP SDU does not exist in the final three bits of the second byte 550, it is not clear how to set up the three bits of the second byte 550. Conventionally, due to a byte alignment of the bitmap, the bits of the second byte 550 in which the PDCP SDU does not exist are defined to be set as "1". That is, the bits of the second byte 550 is set as bits "1 1 1". However, when the bits are set as "1", the SDU may be lost.

For example, if the terminal 305 did not receive SDU [115], although the base station transmitted SDU [115], the terminal 305 is unable to recognize that the base station transmitted SDU [115]. The terminal 305 then sets the first bit of the final three bits of the second byte 550, which is a bit corresponding to SDU [115], as "1". Accordingly, the terminal 305 will transmit a PDCP status report. The base station that received the PDCP status report misunderstands that SDU [115] is successfully transmitted and discards a corresponding SDU in the buffer. For this reason, the bits of the second byte 550 in which a corresponding PDCP SDU does not exist due to the byte alignment of the bitmap 420 are set as "0", which is identical to a case of non-reception, so that the loss of data in the handover is prevented. That is, the bits of the second byte 550 is set as "0 0 0".

Moreover, only when the number of the SDU, which is not received, is equal to two or more, the bitmap 420 is included. The bitmap 420 is not included when the number of the SDU, which is not received, is equal to one. Accordingly, retransmission of an unnecessary PDCP SDU may occur. In FIG. 5, although SDU [101] 510 was not received, it is assumed herein that SDU [102] to SDU [114] are successfully received. Since the number of the SDU, which is not received, is equal to one, the terminal 305 sets the FMS field 540 as "FMS=101" and transmits the PDCP status report, which does not include the bit-map 420. That is, the terminal transmits only the reception information of SDU [101]. The base station that receives the PDCP status report retransmits the PDCP SDUs which does not indicate reception information in the PDCP status report. Thus, the PDCP SDU [102] to PDCP SDU [114] is retransmitted. In an exemplary implementation, the bitmap inclusion condition removes inefficiency and will be described in more detail below.

When a PDCP SDU, which is out of sequence, is stored in the PDCP buffer 505, the terminal 305 includes the bitmap 420. Whereas, when the PDCP SDU, which is out of sequence, is not stored in the PDCP buffer 505, the terminal 305 does not include the bitmap 420. Accordingly, if the PDCP SDU which is out of sequence exists even though only one SDU, which is not received, exists, then the bitmap 420 is included. Therefore, the retransmission of the PDCP SDU which is received, but is out of sequence, may be prevented. For example, when an arbitrary PDCP SDU satisfies the following condition, a corresponding PDCP SDU is a SDU which is out of sequence. That is, if the PDCP SDU exists, which is unable to be transmitted to a higher layer due to a non-reception PDCP SDU having a sequence number lower than its own sequence number and stored in the PDCP, a corresponding PDCP SDU is a SDU which is out of sequence. For example, in FIG. 4, even though SDU [102] to SDU [111] were received, SDU [111] is not received because it is unable to be transmitted to a higher layer (i.e., application layer), and should be temporarily stored in the PDCP. That is, the SDU [111] is out of sequence. In this case, unnecessary retransmission may be prevented by transmitting reception information of the PDCP SDU which is out of sequence, even though only one SDU, which is not received, exists.

Figure 6:
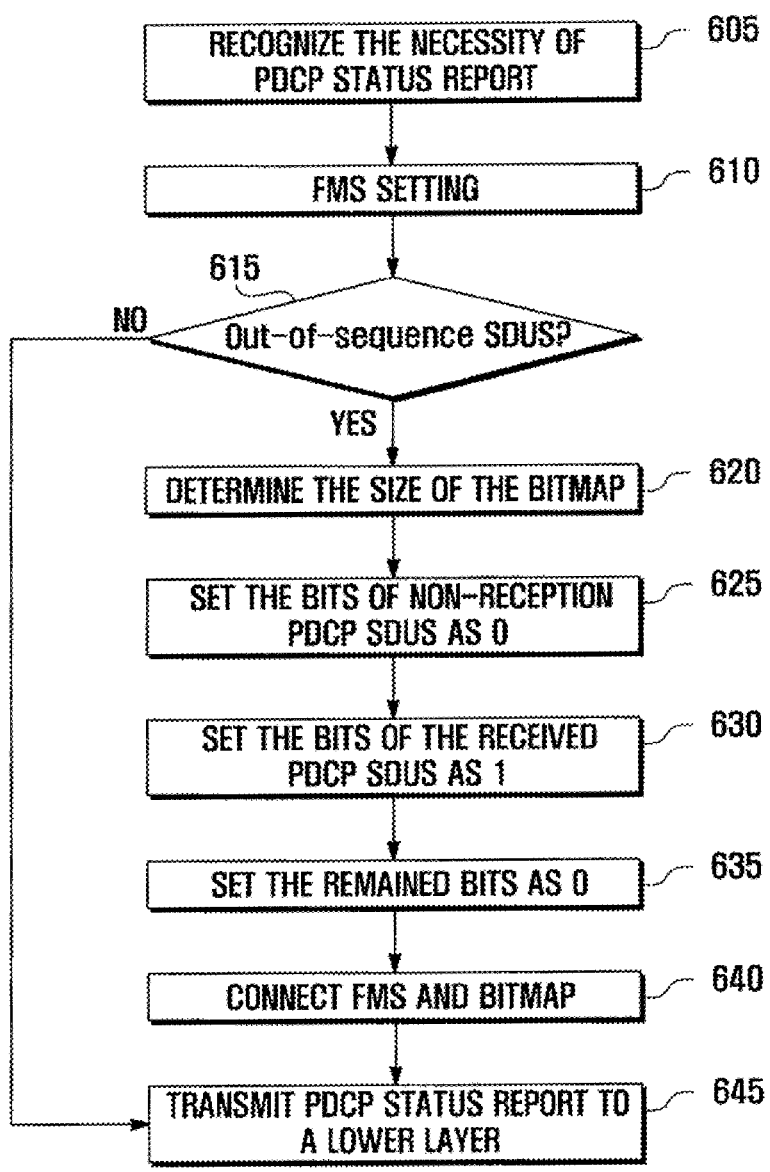
FIG. 6 is a flowchart illustrating a method for configuring a PDCP status report on a PDCP and for transmitting the PDCP status report to a lower layer according to an exemplary embodiment of the present invention.

FIG. 6 is a flowchart illustrating a method for configuring a PDCP status report on a PDCP and for transmitting the PDCP status report to a lower layer according to an exemplary embodiment of the present invention.

In an exemplary implementation, an operation is applicable in both a terminal and a base station, which include a PDCP apparatus.

Referring to FIG. 6, the PDCP apparatus recognizes a necessity for generating a PDCP status report in step 605. For example, if handover occurs, a given PDCP apparatus which may be set to perform a lossless handover configures the PDCP status report and transmits the PDCP status report. The PDCP apparatus sets an FMS with reference to sequence numbers of the PDCP SDUs stored in the PDCP buffer 505. When a handover occurs, out-of-sequence PDCP SDUs are temporarily stored in the PDCP buffer 505 and the FMS is set with a lowest sequence number among non-reception PDCPs having greater sequence numbers than the PDCP SDUs which have already transmitted to a higher layer. For example, in FIG. 5, the SDUs up to SDU [100] have already transmitted to a higher layer, and the FMS field 540 is set as 101 (i.e., FMS=101). Accordingly, SDU [101] to SDU [112] are indicated as non-reception PDCP SDUs. The PDCP apparatus examines whether an out of sequence PDCP SDU is stored in the PDCP buffer 505 in step 615.

If the out of sequence PDCP SDU is not stored in the PDCP buffer, the PDCP SDU which is received after the PDCP SDU corresponding to the FMS does not exist. Therefore, the PDCP status report may be configured with the FMS field. Accordingly, the PDCP apparatus transmits the PDCP status report to a lower layer at an appropriate time in step 645, and terminates the process.

On the other hand, if the out of sequence PDCP SDU exists, the PDCP SDU whose reception condition has to be reported exists among the PDCP SDUs whose sequence number may be greater than the PDCP SDU corresponding to FMS. Therefore, if the at least one out of sequence PDCP SDU exists, a bitmap has to be generated. Therefore, if at least one out of sequence PDCP SDU is stored in the PDCP buffer 505, the PDCP apparatus determines the size of the bitmap 420 in step 620. The size of the bitmap may be set in such a manner that the size may include the highest number bit among the sequence numbers of the out of sequence PDCP SDUs stored in the PDCP buffer 505 and may be byte aligned. The size of the bitmap may be determined by Equation 1 below.

$$\text{Size of BITMAP} = \text{Ceiling}\,[(\text{Highest out-of-sequence SN} - \text{FMS})/8,\ 1] \quad (1)$$

Referring to Equation 1, the size of the bitmap is a byte, and a "Highest out-of-sequence SN" denotes the highest sequence number among the sequence numbers of out of sequence PDCP SDUs. As shown in Equation 1, the size of bitmap is determined by subtracting the sequence number described in the FMS field from the highest out-of-sequence SN and dividing the subtracted number by the size of the byte (i.e., 8 bits). Here, the size of the bitmap is 1 byte or more. For example, in FIG. 5, the FMS is set as 101 and the highest out-of-sequence SN is 114. Thus, the size of the bitmap is 2 byte. The PDCP apparatus then sets the bits of a location corresponding to non-reception PDCP SDUs among the bits of the bitmap 420 as "0" in step 625. The PDCP apparatus sets the bits of the location corresponding to the received PDCP SDUs among the bits of bitmap 420 as "1" in step 630. The PDCP apparatus then sets the bits which are not yet set either as "0" or "1" among the bitmap 420 set as "0" in step 635. That is, the bits inevitably inserted due to the byte alignment of the bitmap 420 are set as "0" The PDCP apparatus configures the PDCP status report by connecting the FMS 415 and the bitmap 420 in step 640. The PDCP apparatus then transmits the PDCP status report to a lower layer at an appropriate time in step 645 to terminate the process FIG. 7 is a flowchart illustrating a PDCP status report receiving method according to an exemplary embodiment of the present invention.

Figure 7:
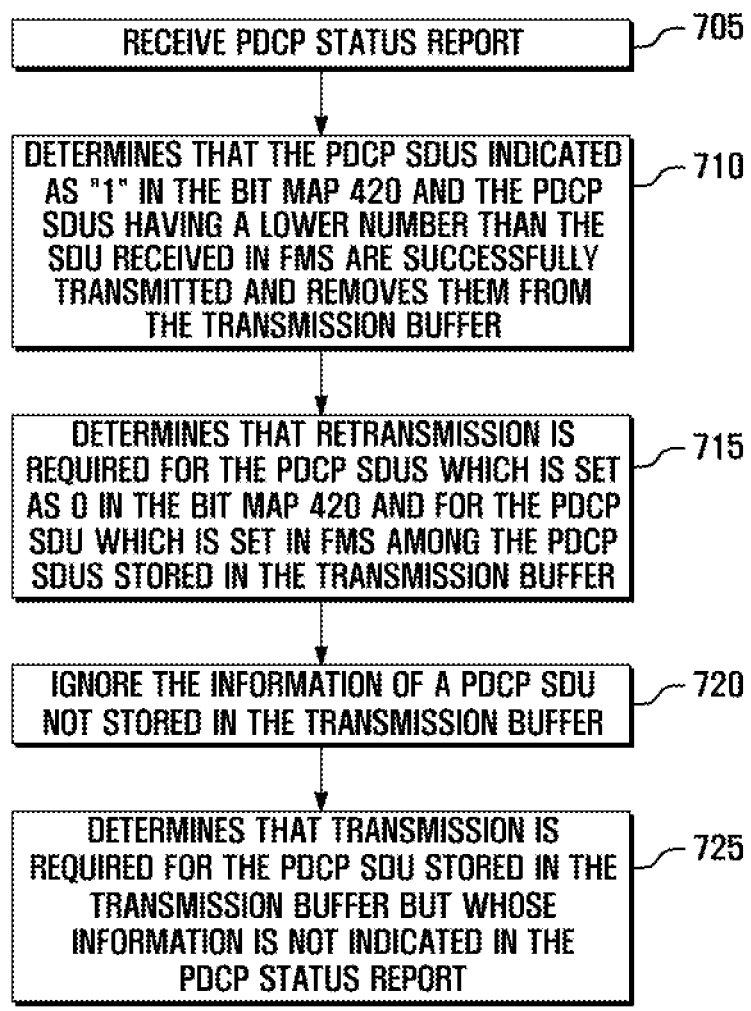
FIG. 7 is a flowchart illustrating a PDCP status report receiving method according to an exemplary embodiment of the present invention.

Referring to FIG. 7, a terminal and a base station both include a PDCP apparatus. The PDCP apparatus receives a PDCP status report in step 705. It is assumed herein that the PDCP status report is identical to the PDCP status report described in FIG. 5. More particularly, the bits of the second byte 550 may be assumed to be set as "0 0 0." The PDCP apparatus then determines that, among the PDCP SDUs stored in a transmission buffer, the PDCP SDUs indicated as "1" in the bitmap 420 and the PDCP SDUs having a lower number than the SDU received in an FMS are successfully transmitted. The PDCP apparatus removes the PDCP SDUs from the transmission buffer in step 710. For example, the PDCP apparatus removes SDU [102] to SDU [111], SDU [113] and SDU [114] from the transmission buffer. In addition, the PDCP apparatus removes the PDCP SDU having a lower serial number than SDU [101]. The PDCP apparatus determines that retransmission is required for the PDCP SDUs which are set as "0" in the bitmap 420 and for the PDCP SDU which is set in the FMS among the PDCP SDUs stored in the transmission buffer in step 715. The PDCP apparatus also maintains a storage status of a corresponding data unit to transmit the PDCP SDUs when a future transmission opportunity occurs. For example, a PDCP SDU having a lower serial number than SDU [112] and SDU [101] is removed. The PDCP apparatus then ignores information of a PDCP SDU that is not stored in the transmission buffer, among the information stored in PDCP status report in step 720. For example, the information may be bits inserted for the byte alignment of the bitmap 420. That is, the information may be the three SDUs after SDU [114]. The PDCP apparatus determines that transmission or retransmission is required for the PDCP SDU stored in the transmission buffer, but whose information is not indicated in the PDCP status report in step 725, and transmits the PDCP SDU when a future transmission opportunity occurs.

Figure 8:
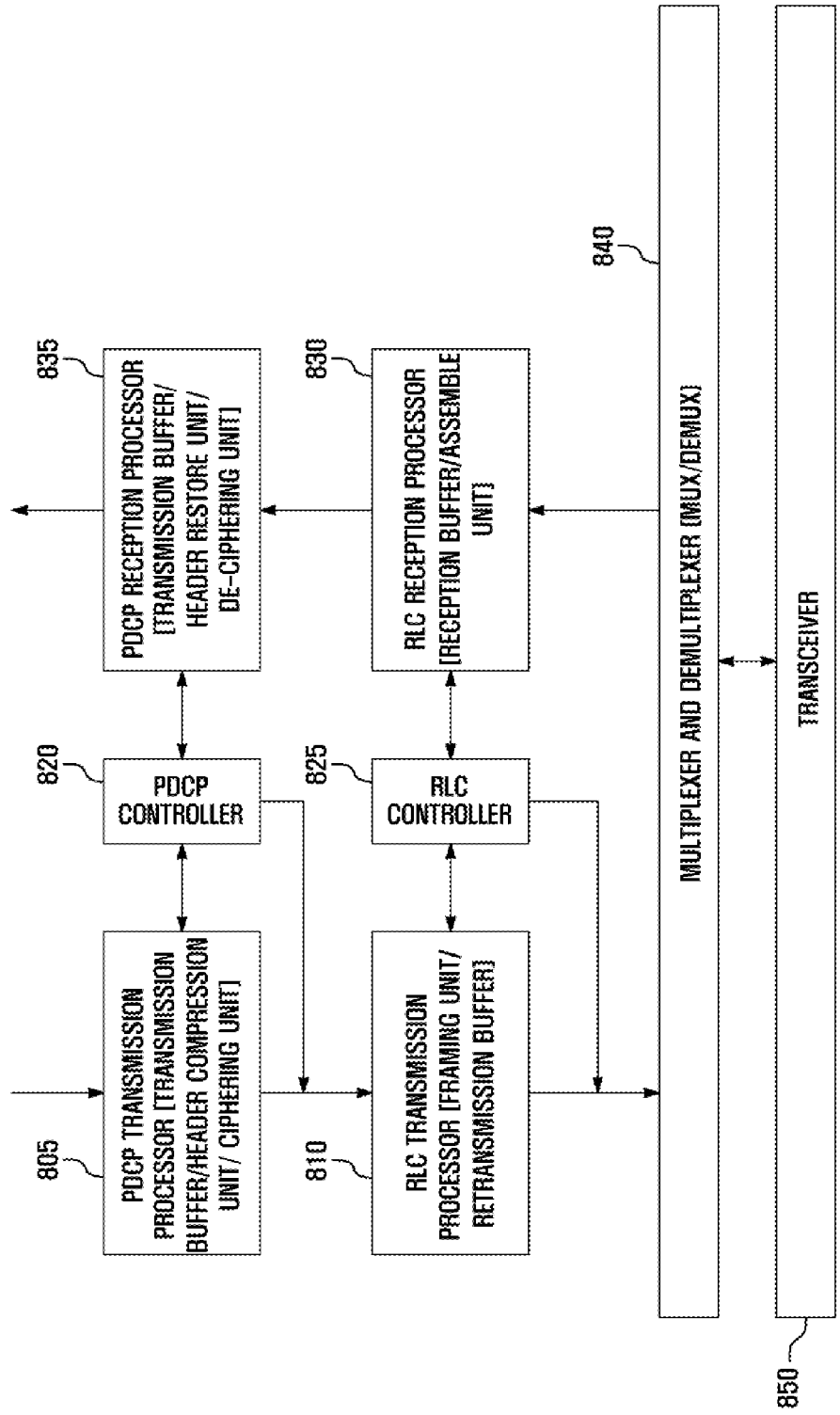
FIG. 8 is a block diagram illustrating a terminal or a base station including a PDCP apparatus according to an exemplary embodiment of the present invention.

FIG. 8 is a block diagram illustrating a terminal or a base station including a PDCP apparatus according to an exemplary embodiment of the present invention.

Referring to FIG. 8, a terminal or a base station includes a PDCP transmission processor 805, a PDCP controller 820, a PDCP reception processor 835, a RLC transmission processor 810, a RLC controller 825, a RLC reception processor 830, a multiplexer and demultiplexer (MUX/DEMUX) 840 and a transceiver 850. Here, the PDCP transmission processor 805, the PDCP controller 820 and the PDCP reception processor 835 correspond to the PDCP apparatus, while the RLC transmission processor 810, the RLC controller 825 and the RLC reception processor 830 correspond to a RLC apparatus.

The PDCP transmission processor 805 stores an upper layer packet until a point in time which retransmission is not necessary, and compresses and ciphers a header in case of transmission of the upper layer packet. The PDCP reception processor 835 performs operations of reversely ciphering an RLC SDU transmitted by the RLC reception processor 830 and restoring a header. The PDCP reception processor 835 performs an operation of storing PDCP SDUs, which is out of sequence due to non-reception PDCP SDU during handover, into a buffer. The PDCP controller 820 examines sequence numbers of the PDCP SDUs stored in the PDCP reception processor 835 during or after handover, generates a PDCP status report, and transmits the PDCP status report to a lower layer apparatus, that is, the RLC transmission processor, at an appropriate time. At this time, the PDCP controller 820 describes a sequence number of a data unit having the lowest sequence number among the data units which have not been received in an FMS. In addition, the PDCP controller 820 determines whether any data unit having a greater sequence number than the data unit described in the FMS due to an out of sequence data unit exists among pre-received data units.

At this time, if an out of sequence data unit exists, the PDCP controller 820 generates a bitmap which indicates the reception of a plurality of data units having a greater sequence number than the sequence number described in the FMS. The PDCP controller 820 sets the bit indicating a pre-received data unit as "1,"and sets the bit indicating a non-reception data unit as "0."

The size of the bitmap is allocated with a unit of a byte, and a redundant bit may remain. The redundant bit indicates the data unit which does not exist in the PDCP reception processor 835. In this case, the PDCP controller 820 sets the bit indicating the data unit which does not exist in the PDCP reception processor 835 as "0." When a PDCP status report is received, the PDCP controller 820 determines a retransmission or removal of the PDCP SDUs stored in the buffer of the PDCP transmission processor 805 according to PDCP status report. The PDCP controller 820 determines that among the PDCP SDUs stored in the buffer of the PDCP transmission processor 805, the PDCP SDUs indicated as "1" in the bitmap 420 of PDCP status report and the PDCP SDUs having a lower sequence ,number than the sequence number described in the FMS have successfully transmitted and removes the successfully transmitted PDCP SDUs.

The PDCP controller 820 determines that among the PDCP SDUs stored in the buffer of the transmission processor 805, retransmission is required for the PDCP SDU set as "0" in the bitmap 420 and for the PDCP SDU set in the FMS. The PDCP controller retransmits corresponding PDCP SDUs when a future transmission opportunity occurs. The PDCP controller 820 ignores information of the PDCP SDU not stored in the buffer of the transmission processor 805 among the information stored in the PDCP status report.

The PDCP controller 820 determines that transmission or retransmission is required for the PDCP SDUs which is stored in the buffer of the transmission processor 805 but whose information is not indicated in the PDCP status report, and retransmits a corresponding PDCP SDUs when a future transmission opportunity occurs. The RLC transmission processor 810 performs framing with respect to the PDCP PDU, that is, configures an appropriate size of an RLC PDU by connecting or dividing the PDCP PDU. The RLC transmission processor also stores the transmitted RLC PDU into a retransmission buffer until an RLC Acknowledgment (ACK) is received. The RLC reception processor 830 stores the RLC PDU received from a DEMUX apparatus into a transmission buffer, assembles the RLC PDU, which may be assembled into the PDCP PDU, and transmits the RLC PDU to the PDCP reception processor 830. The PLC controller 825 examines the sequence numbers of an RLC PDUs stored in the reception buffer of the RLC reception processor 830 and generates RLC status report which requires retransmission of a non-reception RLC PDU at an appropriate time. The PDCP processors 805, 835, the RLC processors 810, 830, the PDCP controller 820 and the RLC controller 825 are equipped with one per logical channel. The MUX/DEMUX 840 is an apparatus for multiplexing RLC PDUs generated from a plurality of logical channels into a Medium Access Control (MAC) PDU or demultiplexing MAC PDU into the RLC PDUs. The transceiver 850 is an apparatus for transmitting or receiving the MAC PDU through a wireless channel according to a given procedure. According to exemplary embodiments of the present invention as described above, when an out of sequence data unit exists, by generating a bitmap and transmitting a control message for retransmission request by indicating "non-reception" with respect to the data unit whose reception is unclear, unnecessary retransmission and data loss may be prevented.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a control message, the method comprising:
   setting a first missing sequence number (FMS) field to be a sequence number of a first missing data unit, the first missing data unit being only one missing data unit;
   generating a bitmap field indicating a reception of a plurality of data units when there is at least one out-of-sequence data unit;
   generating the control message including the FMS field and the bitmap field; and
   transmitting the control message,
   wherein the at least one out-of-sequence data unit is stored in a buffer and not forwarded to a higher layer due to the first missing data unit having a sequence number lower than a sequence number of the at least one out-of-sequence data unit, and
   wherein the generating the bitmap field comprises setting a bit value as '0' in a position in the bitmap field which corresponds to non-existent data units due to a byte alignment of the bitmap field.

2. The method of claim 1, wherein the generating of the bitmap field comprises:
   generating the bitmap field for data units having sequence numbers greater than the FMS.

3. The method of claim 1, wherein the generating of the bitmap field comprises:
   setting a bit value as '1' in a corresponding position in the bitmap field for data units which have been received.

4. The method of claim 1, wherein the generating of the bitmap field comprises:

determining a length of the bitmap field based on a highest out-of-sequence data unit sequence number and the FMS.

5. The method of claim 4, wherein the length of the bitmap field is determined based on the following equation:

the length of the bitmap field=ceiling [(the highest out-of-sequence data unit sequence number −the FMS)/8, 1].

6. The method of claim 5, wherein the generating of the bitmap field comprises:
setting a bit value as '0' in a corresponding position in the bitmap field for each data unit having a sequence number greater than the highest out-of-sequence data unit sequence number.

7. The method of claim 1, wherein, when there is no out-of-sequence data unit, the control message only includes the FMS field which indicates a lowest sequence number of non-reception data unit.

8. An apparatus for transmitting a control message, the apparatus comprising:
a controller configured to control to:
set a first missing sequence number (FMS) field to be a sequence number of a first missing data unit, the first missing data unit being only one missing data unit,
generate a bitmap field indicating a reception of a plurality of data units if there is at least one out-of-sequence data unit, and
generate the control message including the FMS field and the bitmap field; and
a transmitter configured to transmit the control message, wherein the at least one out-of-sequence data unit is stored in a buffer and not forwarded to a higher layer due to the first missing data unit having a sequence number lower than a sequence number of the at least one out-of-sequence data unit, and
wherein the controller is further configured to set a bit value as '0' in a position in the bitmap field which corresponds to non-existent data units due to a byte alignment of the bitmap field.

9. The apparatus of claim 8, wherein the controller is further configured to generate the bitmap field for data units having sequence numbers greater than the FMS.

10. The apparatus of claim 8, wherein the controller is further configured to set as '1' in a corresponding position in the bitmap field for data units which have been received.

11. The apparatus of claim 8, wherein the controller is further configured to determine a length of the bitmap field based on a highest out-of-sequence data unit sequence number and the FMS.

12. The apparatus of claim 11, wherein the length of the bitmap field is determined based on the following equation:

the length of the bitmap field=ceiling [(the highest out-of-sequence data unit sequence number −the FMS)/8, 1].

13. The apparatus of claim 12, wherein the controller is further configured to set a bit value as '0' in a corresponding position in the bitmap field for each data unit having a sequence number greater than the highest out-of-sequence data unit sequence number.

14. The method of claim 8, wherein, when there is no out-of-sequence data unit, the control message only includes the FMS field which indicates a lowest sequence number of non-reception data unit.

* * * * *